Jan. 15, 1929.
E. HUTCHENS
1,698,846
INDIVIDUAL VULCANIZER FOR FLAPS, ETC
Filed April 2, 1926     2 Sheets-Sheet 1
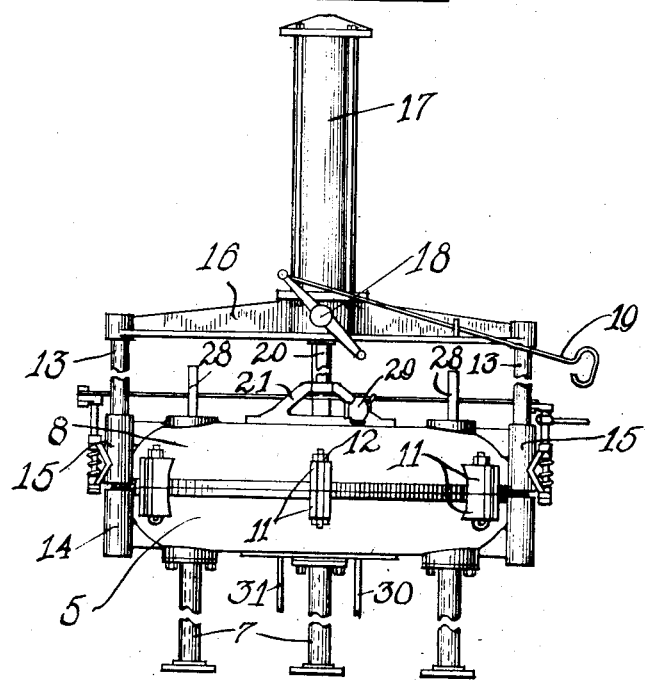
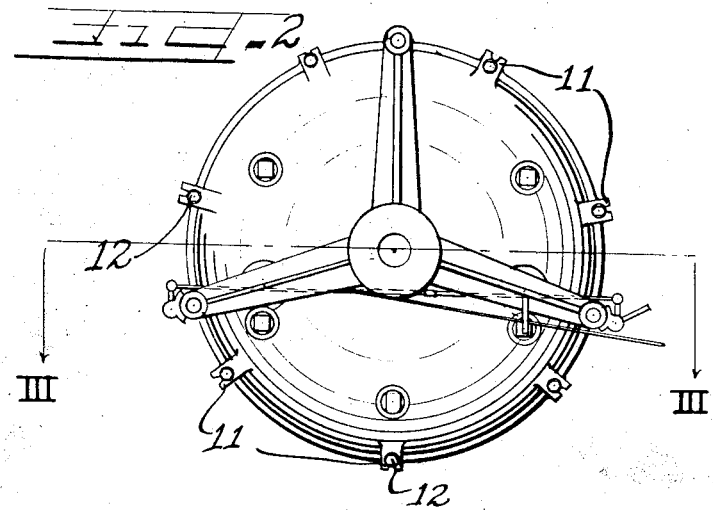
INVENTOR
Edward Hutchens
BY Charles W Hills
ATTYS

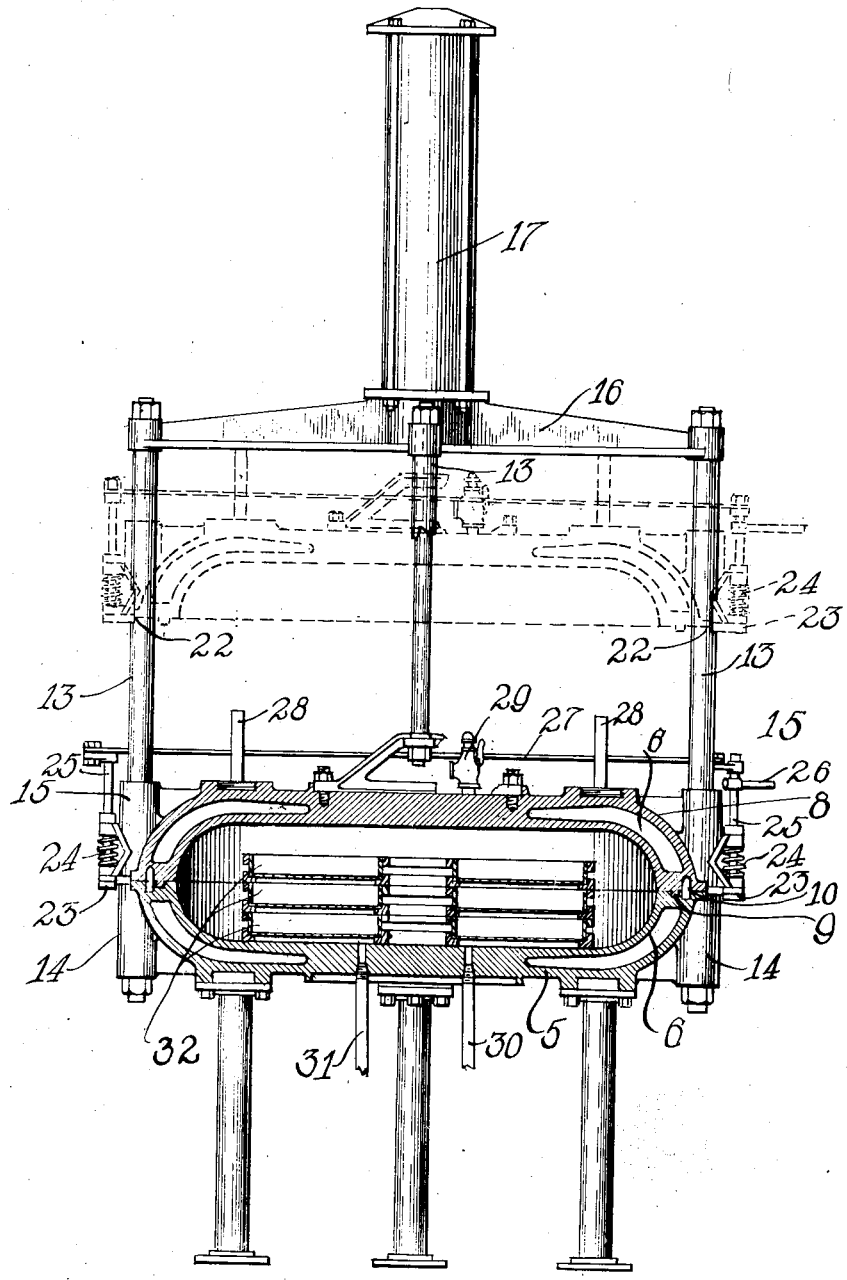

Patented Jan. 15, 1929.

1,698,846

UNITED STATES PATENT OFFICE.

EDWARD HUTCHENS, OF MILWAUKEE, WISCONSIN, ASSIGNOR TO UTILITY MANUFACTURING CO., OF CUDAHY, WISCONSIN, A CORPORATION.

INDIVIDUAL VULCANIZER FOR FLAPS, ETC.

Application filed April 2, 1926. Serial No. 99,217.

This invention relates to individual vulcanizers for vulcanizing rubber articles or the insulation of wire coiled or wound up and placed in soapstone trays or molds.

It is an object of this invention to provide an improved vulcanizer adapted to expedite the handling of reels or coils of insulated wire, rubber hose, tire flaps during the curing operation. Individual vulcanizers result in a large saving of steam and entirely eliminate the cooling period as compared with the commonly used pot or tank heaters which are not susceptible to individual treatment of small lots varying in size and time required to cure.

It is another object of this invention to provide an individual vulcanizer of the class described wherein the contents may be vulcanized in dry heat or surrounded by steam, air, inert gases, water, or other fluids having special adaptability towards producing a uniform or accelerated cure. The choice of the medium largely depends on the compounding of the rubber and the degree and uniformity of cure desired.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of an individual vulcanizer embodying the features of this invention.

Figure 2 is a top plan view thereof.

Figure 3 is a section on the line III—III of Figure 2 also showing in dotted lines the elevated position of the top half of a vulcanizer.

As shown on the drawings:

In referring to the drawing the numeral 5 refers to lower or stationary sections of the vulcanizer which is of cup shape with a steam jacket 6 formed in the walls thereof. This section is supported on suitable legs 7. A movable section 8 is superimposed over the lower section and is in fact a duplicate thereof with slight variations such as a tongue and groove joint 9 and dowels 10 between the mating surfaces, both sections having lugs 11 formed on the periphery thereof to receive clamping bolts 12 pivoted in the lugs of the lower section so that they can be swung down when loosened.

Three guide rods 13 are secured in bosses 14 on the lower member, being so arranged that much more than one third of the circumference of the section at the front or operating position is left free for charging and removing the articles to be vulcanized. Similar bosses 15 are provided on the upper or movable section to slide on the guide posts 13; the upper ends of the guide posts being rigidly joined together by a spider 16 which supports an air cylinder 17 over the center of the sections. An air valve 18 with an operating rod 19 is mounted on the spider to control the admission and discharge of air to the cylinder. The air cylinder forms, in connection with a piston (not shown) and a piston rod 20, an air hoist, the rod 20 being secured to the top or movable section by the bracket 21.

As a safeguard, locking mechanism has been provided for holding the upper section in elevated position irrespective of the action of the air hoist. Notches 22 are cut in two of the posts 13 and dogs 23 are mounted on the bosses 15 of the movable section, these dogs being rotated to engage the notches by the spring 24 urging the shafts 25. To release the dogs, a hand lever 26 is provided on one shaft and a link 27 couples this lever to a crank on the other shaft to operate the dogs simultaneously. In order to release these dogs when the weight of the upper section is borne thereby it is necessary to first slightly lift the section by means of the air hoist thus removing the load from the dogs. Fragmentary steam connections to the jacket 6 are indicated by the numeral 28, and a safety valve 29 is also shown. Fluid supply and drain connections 30 and 31 are shown leading to and from the interior of the vulcanizer itself which in Figure 3 is shown as containing trays 32 suitable for wire, hose, tire flaps or the like. These trays are supported above the lower section to permit a free circulation of the fluid used to complete the cure.

In operation, the upper mold section is raised by means of the air hoist and automatically latches in raised position because of the spring actuated dogs 23 engaging the notches 22. With the mold thus opened, the material to be vulcanized is placed therein and the mold reclosed and clamped by the bolts 12.

A constant steam pressure is maintained in the vulcanizer jackets 6 whether the vulcanizer is open or closed so that no time is lost in cooling off or reheating the vulcanizer. After the vulcanizer is closed, the curing fluid may be introduced at any time, one method being to use dry or steam heat for the initial cure and water for the final curing stage.

I am aware that many changes may be made and numerous details of construction may be varied through a wide range without departing from the principles of this invention, and I therefore do not purpose limiting the patent granted hereon, otherwise than necessitated by the prior art.

I claim as my invention:

In combination in a vulcanizer adapted to be used in the vulcanizing of articles on trays and the like, a pair of cooperable steam jacketed mold members, power means for causing relative movement between said members whereby they may be moved into and out of cooperation with each other, each of said members comprising a shell including a peripheral flange adapted for sealing engagement with the flange of the other member, said members being of such a construction that substantially the entire space defined by said members when the mold is closed constitutes a vulcanizing chamber adapted to receive trays of articles and the like to be vulcanized, means for introducing a pressure medium in said chamber whereby the articles therein are subjected directly to the action of said medium, guide rods on which one of said mold members is movable, said power means being disposed centrally of said rods and connected directly to the top of one of said mold members, and latch means adapted to engage said guide rods to hold said latter or movable mold member in its open position whereby the trays of articles and the like may be placed on and removed from the other mold member with safety.

In testimony whereof I have hereunto subscribed my name.

EDWARD HUTCHENS.